Dec. 31, 1968     P. VON STEIN     3,419,355
RECOVERY OF HIGH PURITY SELENIUM FROM SELENIUM-BEARING
SOLUTIONS CONTAINING METALLIC IMPURITIES
Filed Dec. 17, 1964
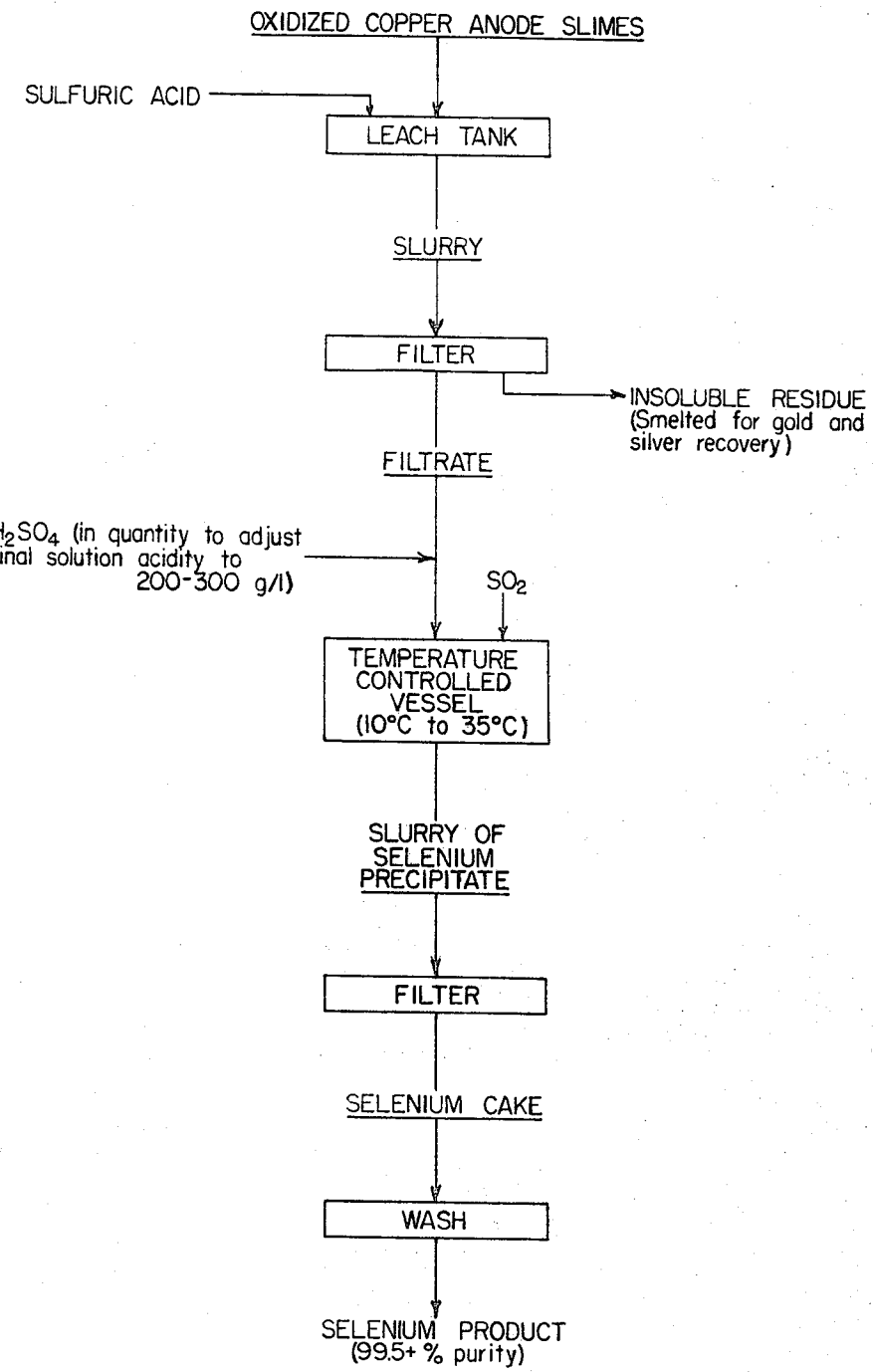
INVENTOR.
PAUL von STEIN
BY
ATTORNEYS United States Patent Office 3,419,355
Patented Dec. 31, 1968

3,419,355
RECOVERY OF HIGH PURITY SELENIUM FROM SELENIUM-BEARING SOLUTIONS CONTAINING METALLIC IMPURITIES
Paul von Stein, Salt Lake City, Utah, assignor to Kennecott Copper Corporation, New York, N.Y., a corporation of New York
Filed Dec. 17, 1964, Ser. No. 419,150
5 Claims. (Cl. 23—209)

ABSTRACT OF THE DISCLOSURE

Commercial grade selenium is precipitated by the addition of $SO_2$ to metallurgical solutions containing selenium and other metals such as tellurium. The temperature of the solution is maintained between 10 to 35° C. during the addition of $SO_2$. Prior to the addition of $SO_2$, the free acid content of the solution is adjusted to at least the equivalent of 200 grams per liter of sulfuric acid.

---

The invention relates to the recovery of selenium from metallurgical solutions thereof containing tellurium and other metallic impurities.

In the electrolytic refining of copper, a slime residue from the impure copper anodes is deposited on the bottoms of the electrolytic cells. This residue ordinarily contains significant amounts of selenium, tellurium, arsenic, copper, gold, silver, etc., and is customarily treated for the recovery of at least the more valuable of these.

In the past, such anode slime residues have been oxidized by roasting or otherwise and leached with acid to provide a selenium-bearing solution, which has then been treated in various ways for the recovery of selenium. However, the selenium obtained by direct precipitation with metallic copper has been of low quality, usually below 90 percent purity, and has not been marketable without refining. Other procedures have not only resulted in similarly impure products, but have been impractical or ineffective in instances of solutions containing large amounts of copper and tellurium values. Thus, the passing of sulfur dioxide gas through such a solution to reduce and precipitate the selenium normally results in the coprecipitation of much of the tellurium present in the solution.

In accordance with the present invention, selenium of high purity is precipitated directly from such a leach solution in a one-step operation. The precipitated selenium has a purity of over 99.5% in most instances and is directly marketable.

This is accomplished by treating the solution with sulfur dioxide gas under conditions of controlled temperature and acidity. I have found that, under proper conditions, the precipitated selenium remains in the red amorphous form assumed initially and that essentially none of the tellurium or any other impurity present in the solution is coprecipitated.

The conditions of temperature and acidity that must be maintained are solution temperature during the gassing period of not over 35° C. and a free acid content of the solution not below the equivalent of 200 grams per liter of sulfuric acid. The temperature can go as low as 10° C. without significant adverse effect, but is preferably maintained at about 30° C. Although the free acid content of the solution must not go below the specified 200 grams per liter, it can go considerably higher, e.g., up to 300 grams per liter, depending upon the particular solution concerned.

The flow sheet of the accompanying drawing presents the invention from the standpoint of its application to a typical copper anode slime and represents the best mode presently known of applying the invention in actual practice.

As depicted in the flow sheet, an oxidized copper anode slime containing principally copper, selenium, tellurium, and arsenic is first leached with sulfuric acid in conventional manner to place the selenium in solution. The resulting slurry is filtered to yield as the filtrate, a solution containing $H_2SO_4$, Cu, Se, Te, and As, and, as the filter cake, an insoluble residue containing gold and silver, which are recovered by smelting.

Pursuant to the invention, the filtrate solution containing the selenium is brought to an acidity of at least 200 grams per liter and preferably higher, i.e., between 200 and 300 grams per liter, by the addition of $H_2SO_4$. Other mineral acids can be used, but except possibly for hydrochloric acid, are not so readily available and are generally much more expensive. Mixtures of sulfuric and hydrochloric acids can sometimes be employed to advantage.

Filtrate solutions derived from the leaching of typical copper anode slimes will contain from one to usually not more than one hundred grams per liter of free $H_2SO_4$, depending upon the amount of acid consumed during leaching, together with from 1.0–50 gl./l. of Cu, 0.2–50 g./l. of Se, 0.2–10 g./l. of Te, and 0.02–1.0 g./l. of As. Accordingly, there will be a considerably quantity of acid added in most instances to bring the solution up to the content required by this invention. If desired, the necessary acid addition can be made to the leach solution before the leaching operation.

Following addition of the acid, sulfur dioxide gas is passed through such solution in a vessel enabling control of temperature, for example a water-cooled reactor. As the temperature of the solution rises due to the chemical reaction taking place, the vessel is cooled to keep the temperature of the solution no greater than 35° C. until essentially all the selenium is precipitated as a red amorphous powder. The reaction is usually complete in an hour.

If an oxidizing mineral acid such as nitric acid is utilized, sufficient $SO_2$ must first be passed through the solution to insure reduction of the acid, followed by continued passing of $SO_2$ to effect precipitation of the selenium.

Upon completion of the gassing operation, the selenium precipitate is separated from the solution, as by passing the contents of the vessel through a filter. The so-separated precipitate is then washed with distilled water several times and is finally filtered and dried to a final, highly pure and marketable product. Washing and decanting the wash water four times prior to the final filtering is usually sufficient.

The following example is typical of experimental work carried out in the laboratory:

An impure selenium-bearing solution having the following analysis:

| | Grams/liter |
|---|---|
| Sulfuric acid | 164.0 |
| Copper | 30.9 |
| Selenium | 8.0 |
| Tellurium | 2.2 |
| Arsenic | 1.5 | had its free acid content raised to 264 grams per liter by addition of sulfuric acid of commercial grade, i.e., 60° Baumé.

Sulfur dioxide gas was bubbled through the resulting solution at the rate of 90 to 100 cc./min. for a period of an hour, while maintaining the temperature of the solution at 30° C. by use of a water-cooled reactor. At the end of the gassing period, the precipitated elemental selenium was still in a red, amorphous, flocculated state.

The precipitated selenium was filtered from the slurry and washed four times with distilled water. For each washing, the solids were allowed to settle and the wash water was decanted. On the final washing, the settled solids were filtered and the resulting filter cake dried. The dried material was found, on analysis, to be well over 99% pure selenium. Its complete analysis was as follows:

| | Analysis, percent | |
|---|---|---|
| | Spectrographic | Chemical |
| Selenium | 99.8 | 99.7 |
| Tellurium | .0096 | .075 |
| Copper | <.005 | .045 |
| Arsenic | .00076 | .0025 |
| Mercury | .00009 | .0004 |
| Antimony | .001 | .0006 |
| Bismuth | <.02 | .0003 |
| Silver | .001 | .003 |
| | 99.838 | 99.827 |

By comparison with the above, a product containing only 49% selenium was obtained when a portion of the same starting solution was boiled in the presence of metallic copper as a precipitant for the selenium. Approximately 150% of the stoichiometric amount of copper required to replace the selenium was used to insure complete precipitation of selenium. The product contained 17% copper and 12% tellurium along with the selenium.

Also by comparison, a product containing only 88% selenium was obtained when sulfur dioxide gas was bubbled at the same rate through a portion of the same starting solution for a period of an hour at ambient temperature without control of free acid content and temperature as called for by the present invention. Shortly after the introduction of the gas, red elemental selenium was observed precipitating from the solution. During the period of treatment, the temperature of the solution rose to 46° C. and the color and physical character of the selenium precipitate changed to black and to dense granules, respectively. Although analysis of the filtrate solution indicated that essentially all of the selenium had been removed, analysis of the product showed that 30% of the tellurium had precipitated simultaneously and in chemical combination with the selenium. The complete analysis of the product was as follows:

| | Analysis, percent | |
|---|---|---|
| | Spectrographic | Chemical |
| Selenium | 88.0 | 87.8 |
| Tellurium | 1.5 | 3.2 |
| Arsenic | 0.006 | |
| Lead | 0.10 | |
| Copper | 4.00 | |
| Antimony | 0.04 | |

Repeated tests of the present process in accordance with the foregoing example were made on quantities of solution ranging from one liter to one hundred gallons with essentially equivalent results.

It should be noted that established specifications for commercial grade selenium requires a purity of at least 99.5%.

Whereas the process is here illustrated and described with respect to a specific procedure presently regarded as the best mode of carrying out the invention, it should be understood that various changes may be made and other procedures adopted without departing from the inventive subject matter pointed out and claimed herebelow.

I claim:
1. A process for recovering commercial grade selenium by a single and direct precipitation step from a selenium-bearing solution containing metallic impurities, comprising
   adding to such a solution a mineral acid until its free acid content is at least equivalent to 200 grams per liter of sulfuric acid; and
   contacting the resulting acidified solution with sulfur dioxide, while maintaining the temperature of the solution within the range of substantially 10 to 35° C., until essentially all the selenium contained therein is precipitated substantially free of impurities; and
   separating the precipitated selenium from the solution.
2. A process as recited in claim 1, wherein the acid is added until the free acid content of the solution is in the range of from 200 to 300 grams per liter.
3. A process as recited in claim 1, wherein the acid added is sulfuric acid.
4. A process as recited in claim 1, wherein the acid added is selected from the group consisting of sulfuric acid, hydrochloric acid, and mixtures thereof.
5. A process as recited in claim 1, wherein the temperature of the solution is maintained at about 30° C.

References Cited

UNITED STATES PATENTS

| 1,730,681 | 10/1929 | Ogden et al. | 23—209 |
| 2,048,563 | 7/1936 | Poland | 23—209 |
| 2,834,652 | 5/1958 | Hollander et al. | 23—209 |
| 2,835,558 | 5/1958 | Vaaler | 23—209 |

FOREIGN PATENTS

| 515,676 | 1940 | Great Britain. |

EARL C. THOMAS, *Primary Examiner.*

BENNETT H. LEVENSON, *Assistant Examiner.*